(12) United States Patent
Okazawa

(10) Patent No.: US 6,308,249 B1
(45) Date of Patent: Oct. 23, 2001

(54) STORING DATA IN A GREY CODE SYSTEM

(75) Inventor: Junka Okazawa, Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/311,954

(22) Filed: May 14, 1999

(30) Foreign Application Priority Data

May 26, 1998 (JP) .................................. 10-144886

(51) Int. Cl.$^7$ .................................................. G06F 12/16
(52) U.S. Cl. .......................... 711/218; 711/217; 710/97; 710/98
(58) Field of Search .................... 711/217, 218; 341/97, 98

(56) References Cited

U.S. PATENT DOCUMENTS

| | | | |
|---|---|---|---|
| 4,550,431 | * 10/1985 | Werth et al. | 382/1 |
| 4,835,712 | * 5/1989 | Drebin et al. | 395/123 |
| 5,381,518 | * 1/1995 | Drebin et al. | 395/124 |
| 5,450,363 | * 9/1995 | Christopherson et al. | 341/98 |
| 5,633,636 | * 5/1997 | Reyhani | 341/97 |
| 5,737,142 | * 4/1998 | Zook | 360/49 |
| 5,758,192 | * 5/1998 | Alfke | 710/57 |
| 6,127,948 | * 10/2000 | Hillis et al. | 341/4 |

OTHER PUBLICATIONS

Computer System Architecture, 3rd Edition, M. Morris Mano, Prentice Hall, 1993, p. 84–85.*

* cited by examiner

Primary Examiner—Matthew Kim
Assistant Examiner—Christian P. Chace
(74) Attorney, Agent, or Firm—Robert A. Walsh

(57) ABSTRACT

To provide an improved memory in which code or data can be read out in the original order even when it is successively accessed by a processor of a successive type according to addressing in a grey code system and a method of storing code/data in such memory. Code/data addressed in the original binary code system are stored in a memory in the form in which the original order and continuity are not lost even after the addresses are converted to a grey code system. Accordingly, a processor of successive type can read out code or data in the original order by consecutively outputting addresses according to a grey code address system. The power consumption of the address generator can be reduced in accessing to consecutive addresses by having addresses of the memory space expressed in a grey code.

4 Claims, 5 Drawing Sheets

Binay-code ordering

| time | A15                 A0 | HEX |
|---|---|---|
| ↓ | 0 0 0 0 0 0 0 0 0 0 0 0 0 0 0 0 | 0000 |
| | 0 0 0 0 0 0 0 0 0 0 0 0 0 0 0 1 | 0001 |
| | 0 0 0 0 0 0 0 0 0 0 0 0 0 0 1 0 | 0002 |
| | 0 0 0 0 0 0 0 0 0 0 0 0 0 0 1 1 | 0003 |
| | 0 0 0 0 0 0 0 0 0 0 0 0 0 1 0 0 | 0004 |
| | 0 0 0 0 0 0 0 0 0 0 0 0 0 1 0 1 | 0005 |
| | 0 0 0 0 0 0 0 0 0 0 0 0 0 1 1 0 | 0006 |
| ↓ | 0 0 0 0 0 0 0 0 0 0 0 0 0 1 1 1 | 0007 |
| | 0 0 0 0 0 0 0 0 0 0 0 0 1 0 0 0 | 0008 |
| | 0 0 0 0 0 0 0 0 0 0 0 0 1 0 0 1 | 0009 |
| | 0 0 0 0 0 0 0 0 0 0 0 0 1 0 1 0 | 000A |
| | 0 0 0 0 0 0 0 0 0 0 0 0 1 0 1 1 | 000B |
| | 0 0 0 0 0 0 0 0 0 0 0 0 1 1 0 0 | 000C |
| | 0 0 0 0 0 0 0 0 0 0 0 0 1 1 0 1 | 000D |
| | 0 0 0 0 0 0 0 0 0 0 0 0 1 1 1 0 | 000E |
| | 0 0 0 0 0 0 0 0 0 0 0 0 1 1 1 1 | 000F |
| | 0 0 0 0 0 0 0 0 0 0 0 1 0 0 0 0 | 0010 |
| | 0 0 0 0 0 0 0 0 0 0 0 1 0 0 0 1 | 0011 |
| | 0 0 0 0 0 0 0 0 0 0 0 1 0 0 1 0 | 0012 |
| | 0 0 0 0 0 0 0 0 0 0 0 1 0 0 1 1 | 0013 |
| | 0 0 0 0 0 0 0 0 0 0 0 1 0 1 0 0 | 0014 |
| | 0 0 0 0 0 0 0 0 0 0 0 1 0 1 0 1 | 0015 |
| | 0 0 0 0 0 0 0 0 0 0 0 1 0 1 1 0 | 0016 |
| | 0 0 0 0 0 0 0 0 0 0 0 1 0 1 1 1 | 0017 |
| | 0 0 0 0 0 0 0 0 0 0 0 1 1 0 0 0 | 0018 |
| | 0 0 0 0 0 0 0 0 0 0 0 1 1 0 0 1 | 0019 |
| | 0 0 0 0 0 0 0 0 0 0 0 1 1 0 1 0 | 001A |
| | 0 0 0 0 0 0 0 0 0 0 0 1 1 0 1 1 | 001B |
| | 0 0 0 0 0 0 0 0 0 0 0 1 1 1 0 0 | 001C |
| | 0 0 0 0 0 0 0 0 0 0 0 1 1 1 0 1 | 001D |
| | 0 0 0 0 0 0 0 0 0 0 0 1 1 1 1 0 | 001E |
| | 0 0 0 0 0 0 0 0 0 0 0 1 1 1 1 1 | 001F |
| | 0 0 0 0 0 0 0 0 0 1 0 0 0 0 0 0 | 0020 | transition# 0 0 0 0 0 0 0 0 0 1 2 4 8 16 32 total transition# = 63

FIGURE 3

Gray-code ordering

| A'15           A'0 | HEX |
|---|---|
| 0 0 0 0 0 0 0 0 0 0 0 0 0 0 0 0 | 0000 |
| 0 0 0 0 0 0 0 0 0 0 0 0 0 0 0 1 | 0001 |
| 0 0 0 0 0 0 0 0 0 0 0 0 0 0 1 1 | 0003 |
| 0 0 0 0 0 0 0 0 0 0 0 0 0 0 1 0 | 0002 |
| 0 0 0 0 0 0 0 0 0 0 0 0 0 1 1 0 | 0006 |
| 0 0 0 0 0 0 0 0 0 0 0 0 0 1 1 1 | 0007 |
| 0 0 0 0 0 0 0 0 0 0 0 0 0 1 0 1 | 0005 |
| 0 0 0 0 0 0 0 0 0 0 0 0 0 1 0 0 | 0004 |
| 0 0 0 0 0 0 0 0 0 0 0 0 1 1 0 0 | 000C |
| 0 0 0 0 0 0 0 0 0 0 0 0 1 1 0 1 | 000D |
| 0 0 0 0 0 0 0 0 0 0 0 0 1 1 1 1 | 000F |
| 0 0 0 0 0 0 0 0 0 0 0 0 1 1 1 0 | 000E |
| 0 0 0 0 0 0 0 0 0 0 0 0 1 0 1 0 | 000A |
| 0 0 0 0 0 0 0 0 0 0 0 0 1 0 1 1 | 000B |
| 0 0 0 0 0 0 0 0 0 0 0 0 1 0 0 1 | 0009 |
| 0 0 0 0 0 0 0 0 0 0 0 0 1 0 0 0 | 0008 |
| 0 0 0 0 0 0 0 0 0 0 0 1 1 0 0 0 | 0018 |
| 0 0 0 0 0 0 0 0 0 0 0 1 1 0 0 1 | 0019 |
| 0 0 0 0 0 0 0 0 0 0 0 1 1 0 1 1 | 001B |
| 0 0 0 0 0 0 0 0 0 0 0 1 1 0 1 0 | 001A |
| 0 0 0 0 0 0 0 0 0 0 0 1 1 1 1 0 | 001E |
| 0 0 0 0 0 0 0 0 0 0 0 1 1 1 1 1 | 001F |
| 0 0 0 0 0 0 0 0 0 0 0 1 1 1 0 1 | 001D |
| 0 0 0 0 0 0 0 0 0 0 0 1 1 1 0 0 | 001C |
| 0 0 0 0 0 0 0 0 0 0 0 1 0 1 0 0 | 0014 |
| 0 0 0 0 0 0 0 0 0 0 0 1 0 1 0 1 | 0015 |
| 0 0 0 0 0 0 0 0 0 0 0 1 0 1 1 1 | 0017 |
| 0 0 0 0 0 0 0 0 0 0 0 1 0 1 1 0 | 0016 |
| 0 0 0 0 0 0 0 0 0 0 0 1 0 0 1 0 | 0012 |
| 0 0 0 0 0 0 0 0 0 0 0 1 0 0 1 1 | 0013 |
| 0 0 0 0 0 0 0 0 0 0 0 1 0 0 0 1 | 0011 |
| 0 0 0 0 0 0 0 0 0 0 0 1 0 0 0 0 | 0010 |
| 0 0 0 0 0 0 0 0 0 0 1 1 0 0 0 0 | 0030 | transition# 0 0 0 0 0 0 0 0 0 1 1 2 4 8 16 total transition# = 32

FIGURE 4

STORING DATA IN A GREY CODE SYSTEM

BACKGROUND OF THE INVENTION

1. Field of the Invention

This invention relates to a memory which is used in an information processing apparatus such as a computer system and a method for storing code/data in the memory. Particularly, this invention relates to a memory which is accessed by a processor of a successive type effecting grey code addressing and method for storing code/data in such memory. More particularly, this invention relates to a memory which allows code or data to be read out in the same sequence as it was originally stored even when a processor of a successive type successively accesses to the memory based on an address of a grey code system, and a method for storing code/data in such memory.

2. Prior Art

Along with recent technological revolution, various kinds of computer systems including host/main frame computers, workstations and personal computers for consumers have been developed, manufactured and widely spread.

The basic components of such computer system includes a processor executing predetermined processing and a memory which the processor utilizes. Specifically, the processor is locally provided with a memory in itself, temporarily stores in the memory program codes which the processor executes and execution data and accesses to the memory at each processing step to read out a code from or write execution data into the memory. The processor and the memory are usually connected by a memory bus on which the processor sends an address to specify an access location in the memory.

However, the memory resource of a computer system is typically limited because the price per unit of storage capacity of a memory is relatively expensive. Thus, the computer system is provided with a storage of a large capacity and of a relatively inexpensive unit price, such as a hard disk, and code/data are exchanged or swapped between the memory and the disk as appropriate.

There may be a variety of schemes of addressing to allocate code or data in a memory space. In the area of the current computer science, a binary code system is most popular in which addresses in ascending decimal order are represented by binary numbers in the same order.

On the other hand, most of processors used in computer systems in these days are of a successive execution type in which addresses for accessing to the memory are consecutive. In other words, the program codes executed by the processor are normally described according to the sequence of execution and the processor can obtain the codes according to the sequence in a source program by successively generating addresses in ascending order, for example. An address generator provided in a processor chip is adapted to generate addresses, for example.

However, it has been pointed out that a problem of bit transition exists when addresses are outputted in the order in the source program to the memory space which is represented by binary codes. As mentioned in the above, a binary code is a simple binary representation of each numeric value (address value) in the order of a decimal number and there is no consideration of bit transition.

SUMMARY OF THE INVENTION

It is an object of this invention to provide an improved memory used in an information processing apparatus such as a computer system and a method of storing code/data in such memory.

It is another object of this invention to provide an improved memory which is accessed by a processor of a successive execution type effecting addressing in a grey code system and a method of storing code/data in such memory.

It is a further object of this invention to provide an improved memory in which code or data can be read out in the original order even when it is successively accessed by a processor of a successive execution type according to addressing in a grey code system and a method of storing code/data in such memory.

This invention is conceived in view of the above objectives and, in its first aspect, provides a memory which is accessed by a processor of successive type effecting addressing in a grey code system and in which addresses expressed by a grey code are allocated to codes/data according to the order of addresses in a binary code system.

This invention provides, in the second aspect thereof, a memory which is accessed by a processor of successive type effecting addressing in a grey code system and in which codes/data ordered in the sequence of addresses in a binary code system are reordered in the sequence of addresses in a grey code system for storage therein.

This invention provides, in the third aspect thereof, a method of storing code/data ordered in a binary code system in a memory in addresses converted to a grey code system in which code/data are consecutively allocated with addresses expressed in the grey code according to the order of the addresses in the binary code system.

This invention provides, in the fourth aspect thereof, a method of storing code/data ordered in a binary code system in a memory in addresses converted to a grey code system in which code/data ordered in the sequence of addresses in a binary code system is reordered to code/data in the sequence of addresses of a grey code system.

This invention provides, in the fifth aspect thereof, a method of storing code/data ordered in a binary code system in a memory in addresses converted to a grey code system comprising: a step of reading out code/data in the order of addresses expressed in a binary code from another memory, a step of sequentially allocating addresses expressed in a grey code to the read out code/data, and a step of storing the code/data according to the allocated grey code addresses.

According to the memory of this invention and the inventive method of storing code/data in such memory, code/data addressed in the original binary code system is stored in the memory without losing the original order and continuity even after the addresses are converted to a grey code system. Thus, a processor of successive type can read out code/data in the original order of execution by consecutively outputting addresses according to addresses of the grey code system. In addition, the power consumption of the address generator can be reduced in accessing to consecutive addresses by expressing addresses in the grey code.

Further objects, features and advantages of this invention will be apparent in the following detailed description based on embodiments of this invention and accompanying drawings.

BRIEF DESCRIPTION OF THE DRAWINGS

FIG. 3 shows a list of 20h of 16 bits binary coded address spaces from the starting address 0000000000000000.

FIG. 4 shows a list of 20h of 16 bits binary code address spaces from the starting address 0000000000000000.

DESCRIPTION OF THE PREFERRED EMBODIMENT

An embodiment of this invention is now described in detail with reference to the drawings.

Figure 1:
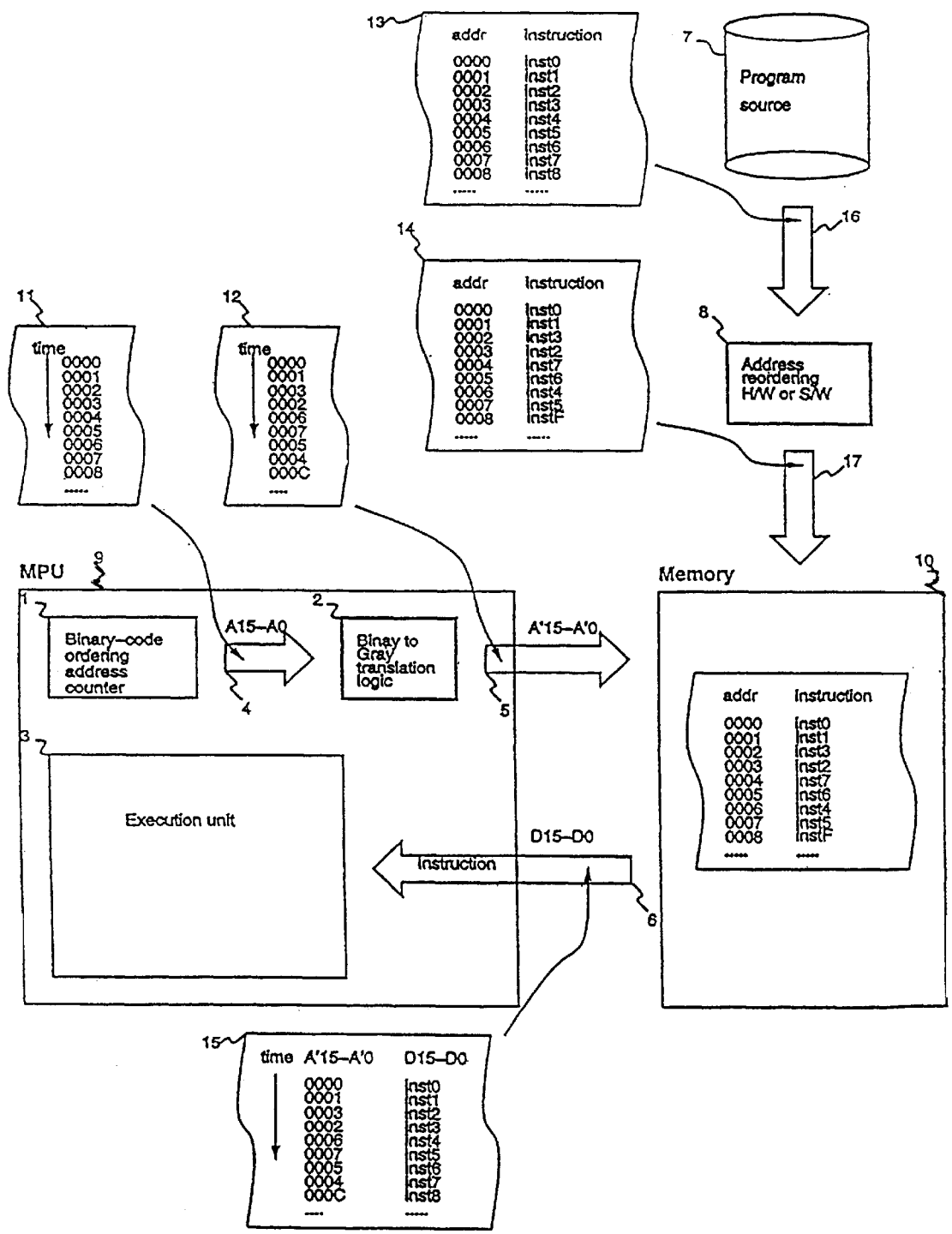
FIG. 1 schematically shows a hardware configuration of a typical personal computer (PC) which is suitable for implementing this invention.

FIG. 1 schematically shows the configuration of a computer system 100 implementing this invention and operational characteristics thereof. It should be understood that many electrical circuits are required to configure the computer system 100 beside those shown in FIG. 1. However, they are omitted in this specification because they well known in the art and do not constitute the essential part of this invention. It should be also understood that only a part of connections between the hardware blocks are shown in the drawing to avoid congestion of the drawing.

As shown in FIG. 1, the computer system 100 comprises a processor 9, a memory 10 and an external storage device 7.

The processor 9 is an arithmetic unit for executing a predetermined processing and includes a digital signal processor (DSP) and the like beside a so-called MPU (Micro Processing Unit). The processor 9 is provided with an address generating function beside an execution unit 3 for executing a predetermined processing.

The address generating function of this embodiment comprises a binary code ordered address counter 1 and a binary/grey conversion logic circuit 2. The binary code ordered address counter 1 is adapted for outputting consecutive addresses expressed in a binary code. The consecutive addresses are required because of the principle of the continuity of program codes. The addresses generated by the binary code ordered address counter 1 are transferred to the binary/grey conversion logic circuit 2 via an address bus 4. The binary/grey conversion logic circuit 2 is a unit for converting addresses received in a binary code system to addresses in a grey code system. The grey code address outputted by the binary/grey conversion logic circuit 2 is supplied to the memory 10 via the address bus 5.

Figure 2:
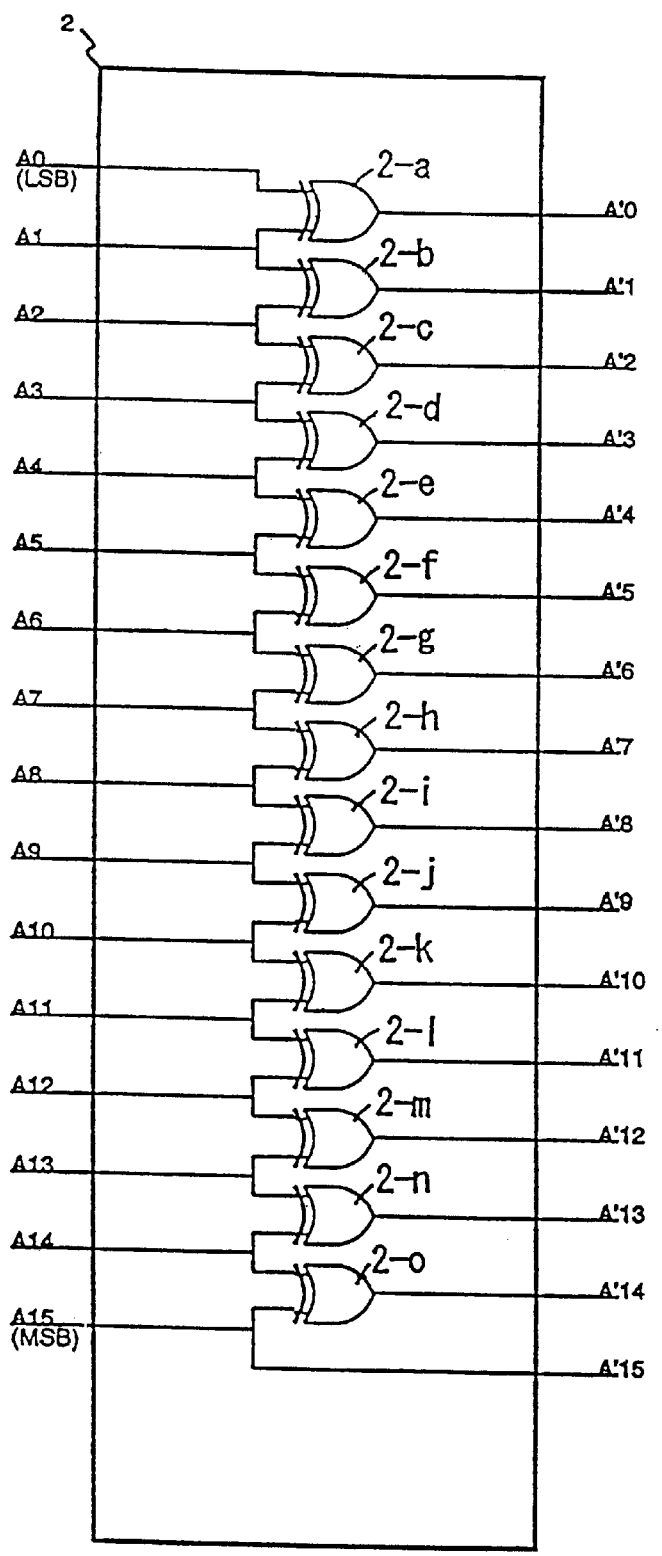
FIG. 2 is a diagram showing an example of a binary/grey conversion logic circuit 2 shown in FIG. 1.

The grey code is also referred to as an alternating binary code or a cyclic code and is generated by coding a "0" when same digits in the normal binary expression are adjacent each other and "1" when different digits are adjacent each other. FIG. 2 schematically shows an example of the binary/grey conversion logic circuit 2. As shown in the figure, the binary/grey conversion logic circuit 2 comprises 15 exclusive OR operators XOR 2-$a$, 2-$b$, . . . and receives a 16 bits address expressed in binary code to output a 16 bits address expressed in grey code. Each XOR receives 2 adjacent binary code address bits as inputs and outputs a grey code address bit of a corresponding digit. It should be noted that the grey code is a code system which is expressed so that minimum bit transitions occur as the value of the address progressively increases.

While the processor 9 is also provided with various hardware modules such as a microcode ROM describing a process and input/output registers, they are not described here.

The memory 10 is disposed locally to the processor 9. Specifically, the memory 10 and the processor 9 are connected by an address bus 5 (16 bits in this embodiment) and a data bus 6 (16 bits in this embodiment). The processor 9 designates an address to be accessed via the address bus 5 while the memory 10 returns code/data at the storage location corresponding to the address via the data bus 6. The memory 10 comprises one or more DRAM (dynamic RAM) chips or SRAM (static RAM) chips, for example. It should be fully noted that the memory 10 has a memory space which conforms to the grey code system according to the code/data storing scheme to be described later.

The external storage device 7 is a large capacity storage device for supplying a source program code to the computer system 100 and a hard disk is an example thereof. The external storage device 7 may be other media such as a CD-ROM afforded by the recent progress of the technology. The external storage device 7 need not be a local disk provided in the system 100 itself and may be a remote disk connected to other computer system which is accessible via a network. The space of the external storage device 7 conforms to binary code system. Further, execution of the source program code conforms to the principle of continuity.

The program code in the external storage device 7 is loaded in the memory 10 via buses 16/17. The code/data transfer scheme from the external storage device 7 to the memory 10 may include DMA transfer, programmable I/O transfer or other transfer scheme.

It is characteristic in this embodiment that an address reordering device 8 is disposed in the transfer path between the external storage device 7 and the memory 10. The address reordering device 8 converts a binary code address of each code in the source program to a binary code address to reorder the codes and causes the memory space of the memory 10 to be expressed in a binary code. Assuming, for example, that the source program includes instructions in the order of inst 0, inst 2, inst 3, inst 4, inst 5, inst 6, . . . , as shown by the reference number 13 in FIG. 1, the instructions are reordered like inst 0, inst 1, inst 3, inst 2, inst 7, inst 6, inst 4 by the address reordering device 8 as shown by the reference number 14 in FIG. 1 for storage in the memory 10.

The address reordering device 8 may be implemented either by a hardware or by a software. When the former is the case, the configuration is substantially same as that in FIG. 2. An example of the latter case is shown below in the form of a pseudo code.

$G(N)=B(N)$

............

$G(n)=B(n)$ xor $B(n\ 1)$ $G(n\ 1)=B(n\ 1)$ xor $B(n)$

............

$G(0)=B(0)$ where;

$G(N)$ is the N-th bit (MSB) of the grey code address, $G(n)$ is the 0-th bit (LSB) of the grey code address, $B(N)$ is the N-th bit of the binary code address, $B(n)$ is the n-th bit of the binary code address, and $B(0)$ is the o-th bit of the binary code address.

The operational characteristic of the processor 9 on the computer system 100 is now described hereunder. It is assumed that execution of the source program by the processor 9 conforms to the principle of continuity.

The binary address ordered address counter 1 consecutively outputs addresses in which continuity is preserved like 0001h, 0002h, 0003h, 0004h, 0005h, 0006h, . . . as shown by the reference number 11 in FIG. 1.

The binary/grey conversion logic circuit 2 converts the binary code addresses received from the binary code ordered address counter 1 successively to grey code addresses. As a result, the memory 10 is supplied with addresses in the order of 0000h, 0001h, 0003h, 0002h, 0006h, 0007h, 0005h, . . . via the address bus 5. Because the binary/grey conversion logic circuit 2 provides address output in the grey code system, the bit transition is minimum even when the memory 10 is accessed by consecutive addresses. The power consumption in the address terminal is thus reduced.

The memory 10 is adapted to return code/data at the storage location corresponding to the designated address. As a result, the execution unit 3 will be supplied with the codes in the order of inst 0, inst 1, inst 2, inst 3, inst 4, inst 5, . . . , . It should be noted that the continuity of the source code is preserved.

The problem of bit transition is now described hereunder with reference to FIG. 3. FIG. 3 shows a list of 20h of 16 bits binary coded address spaces from the starting address 0000000000000000 with equivalent hexadecimal representations associated in the right column. If the address advances from 0000000000000000 to 0000000000000001, for example, a bit transition occurs in the first bit (LSB:Least Significant Bit). When it is then advanced to the address 0000000000000010, bit transitions occur at two bit positions, i.e., the first and the second bits. When accessing successively proceeds from the first address up to the 32nd address, for example, transitions of 32 bits will occur in total. The bit transitions occur 16, 8, 4, 2, 1 times from the first bit to successively higher bits and it is noted that occurrence of transitions is more eminent in the bit nearer the LSB.

It is known in this technology area that a power consumption increases at the address terminal of the address generator as the number of bit transitions increases. Also known in this technology area is an empirical principle that there is a locality and continuity in a program code and data. In other words, frequent accesses to consecutive addresses would result in an increase of power consumption of the address terminal and, thus, the entire processor.

In a computer system operating under the principle of locality and continuity, one technique of resolving the problem of bit transition would include conversion of the address representation from a binary coded system to a grey code system.

The grey code system is explained here with reference to FIG. 4. FIG. 4 shows a list of 20h of 16 bits binary code address spaces from the starting address 0000000000000000 with equivalent hexadecimal representation associated in the right column. The grey code is also referred to as an alternating binary code or a cyclic code and is generated by producing "0" when same binary representations are side by side while producing "1" when different binary representations are side by side. The grey code is a code system which is expressed so as to make the number of transitions occurring as the addresses increases progressively minimum. When accessing proceeds consecutively from the first address to the 32nd address, for example, only 16 bit transitions occur. The transitions occur 8, 4, 2, 1, 1 times from the first bit to successively higher bits.

As such, the processor can reduce the power consumption in the address terminal by decreasing the number of bit transitions in accessing to consecutive addresses of the memory by using address output of a grey code system.

However, a simple change of the address generator of the processor side to a grey code system will result in another problem in which the order of execution of the inherent program code is disordered.

Figure 5:
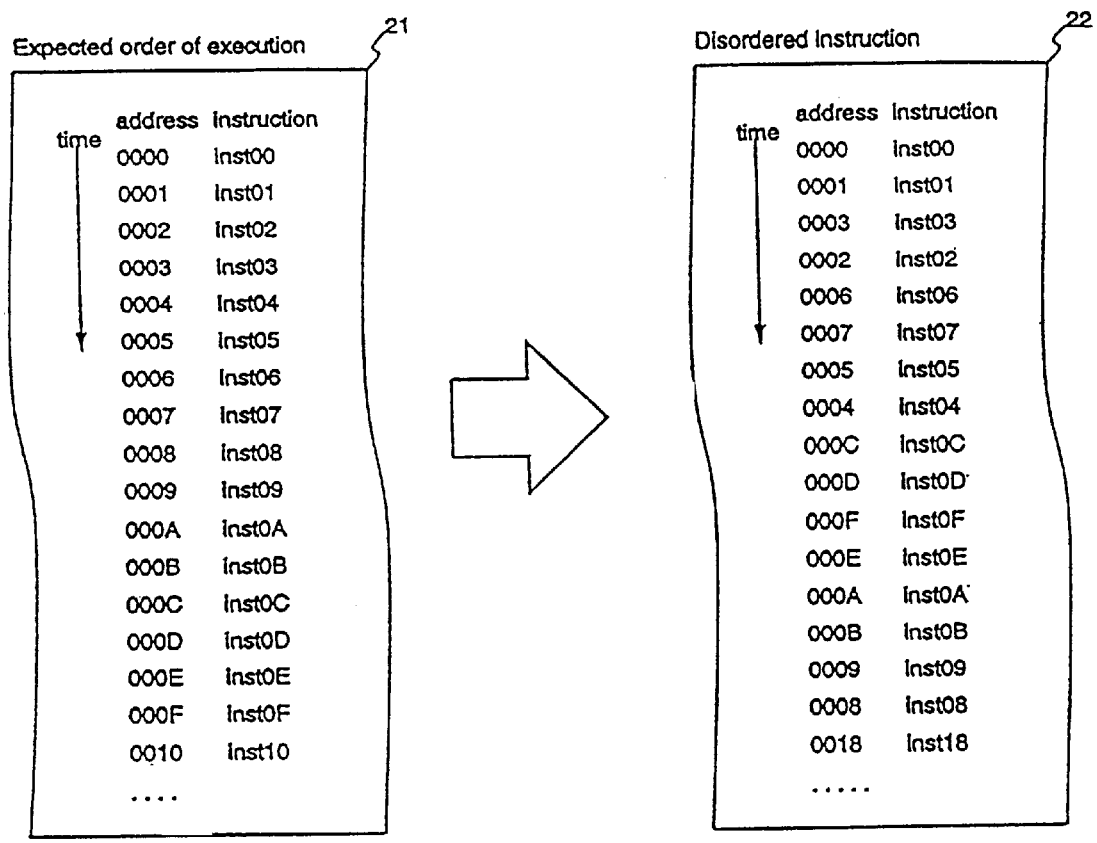
FIG. 5 is a chart illustrating disordering of execution occurring when the addressing scheme of the processor is replaced with a grey code expression.

The problem of disorder of execution is now explained using FIG. 5. The column referred to the reference number 21 in FIG. 5 shows the order of instructions expected to be executed as the time proceeds. As shown in the column, it is expected that instructions are read out in the order of inst 00, inst 01, inst 02, inst 03, inst 04, inst 05, . . . in the source program code. The instructions are allocated with binary expressed addresses 0000h, 0001h, 0002h, 0003h, 0004h, 0005h, . . . in the memory according to the order of execution.

On the other hand, the column referred to the number 22 shows address values which an address generator conforming to the grey code system consecutively outputs in the order of time of generation. As shown in the column, the address generator outputs addresses in the order of 0000h, 0001h, 0003h, 0002h, 0006h, 0007h, . . . If the program code is stored in the memory according to the original binary coded addresses, they will be read out in the order of inst 00, inst 01, inst 03, inst 02, inst 06, inst 07, . . . The order of execution of the code is apparently disordered.

As described in detail, this invention provides an improved memory for use in an information processing apparatus such as a computer system and a method of storing code/data in such memory.

This invention also provides an improved memory which is accessed by a processor of a successive type effecting addressing in a grey code system and a method of storing code/data in such memory.

This invention also provides an improved memory in which code or data can be read out in the original order even when it is successively accessed by a processor of a successive type according to addressing in a grey code system and a method of storing code/data in such memory.

While this invention has been described with reference to a specific embodiment, it is obvious that modifications and alterations of the disclosed embodiment can be done by those skilled in the art without departing from the gist of this invention. In other words, this invention has been disclosed in the form of an example and should not be interpreted with restriction.

What is claimed is:

1. A method of storing data ordered in a binary code system in a memory with addresses converted to a grey code system comprising;

a step of reading out data in the order of addresses expressed in a binary code from an external memory, a step of sequentially allocating addresses expressed in a grey code to the read out data, a step of storing the readout data according to the allocated grey code addresses in the memory, and a step of generating addresses from a successor type processor which is ordered in sequence of addresses in a binary code system is reordered to data in the sequence of addresses of a grey code system to the memory.

2. A method of storing data ordered in a binary code system in a memory in addresses converted to a grey code system of claim 1 in which data are consecutively allocated with addresses expressed in the grey code according to the order of the addresses in the binary code system.

3. A memory of storing data ordered in a binary code system in a memory in addresses converted to a grey code system of claim 1 in which the memory is accessed by a successor type processor affecting addressing in a grey code system and the data ordered in the sequence of addresses in a binary code system are reordered in the sequence of addresses in a grey code system for storage therein to the order of addresses in a binary code system.

4. A memory of storing data ordered in a binary code system in a memory in addresses converted to a grey code system of claim 2 in which the memory is accessed by a successor type processor affecting addressing in a grey code system and the addresses expressed by a grey code are allocated to data according to the order of addresses in a binary code system.

* * * * *